(12) United States Patent
Honda et al.

(10) Patent No.: US 7,306,543 B2
(45) Date of Patent: Dec. 11, 2007

(54) AUTOMATIC TRANSMISSION CONTROLLER

(75) Inventors: Masashi Honda, Okazaki (JP); Akira Takagi, Obu (JP); Kyohei Takahashi, Kariya (JP); Fuminori Suzuki, Okazaki (JP)

(73) Assignee: Denso Corporation (JP)

( * ) Notice: Subject to any disclaimer, the term of this patent is extended or adjusted under 35 U.S.C. 154(b) by 226 days.

(21) Appl. No.: 11/285,088

(22) Filed: Nov. 23, 2005

(65) Prior Publication Data

US 2006/0116240 A1    Jun. 1, 2006

(30) Foreign Application Priority Data

Nov. 26, 2004    (JP)    ............... 2004-342918

(51) Int. Cl.
*F16H 61/26*    (2006.01)

(52) U.S. Cl. ............ 477/160; 477/143; 477/155; 477/156; 477/158; 477/164; 477/174; 477/180; 475/116; 475/117; 475/118; 475/127

(58) Field of Classification Search ............ None
See application file for complete search history.

(56) References Cited

U.S. PATENT DOCUMENTS 5,971,889 A * 10/1999 Ohashi et al. ............... 477/149
6,726,589 B2 * 4/2004 Horiguchi ............... 475/116
6,780,141 B1 * 8/2004 Kao et al. ............... 477/164
7,104,925 B2 * 9/2006 Takagi ............... 477/156
7,201,703 B2 * 4/2007 Ochi et al. ............... 477/174

FOREIGN PATENT DOCUMENTS

JP    5-296327    11/1993

* cited by examiner

*Primary Examiner*—David D. Le
(74) *Attorney, Agent, or Firm*—Nixon & Vanderhye PC

(57) ABSTRACT

An automatic transmission controller has an electronic control circuit, an electromagnetic valve, and a pressure control valve. The electronic control circuit generates a control current. The electromagnetic valve regulates a command pressure in accordance with the control current. The pressure control valve has a spool and is formed with a spool hole. The spool reciprocates in the spool hole in accordance with the command pressure to regulate a pressure supplied to a friction element of an automatic transmission. In a standby state, when the friction element is in a disengaged state, the electronic control circuit generates an oscillating current as the control current so that the electromagnetic valve generates a standby command pressure that makes the spool reciprocate in a range in which no pressure is supplied to the friction element.

8 Claims, 4 Drawing Sheets

AUTOMATIC TRANSMISSION CONTROLLER

CROSS REFERENCE TO RELATED APPLICATION

This application is based on and incorporates herein by reference Japanese Patent Application No. 2004-342918 filed on Nov. 26, 2004.

BACKGROUND OF THE INVENTION

1. Field of the Invention

The present invention relates to an automatic transmission controller.

2. Description of Related Art

A known automatic transmission controller controls an automatic transmission by supplying a fluid pressure to a friction element of the automatic transmission. This kind of automatic transmission controller, described in JP-A-H05-296327, applies a standby pressure (a low fluid pressure at which the friction element is not engaged) to the friction element that is in a disengaged state to obtain a high engagement response.

The automatic transmission controller described in JP-A-H05-296327 applies an output pressure of an electromagnetic valve directly to the friction element. In such a case, the output pressure of the electromagnetic valve supplied to the friction element acutely responds to a resistance change of a coil inside the electromagnetic valve that depends on an ambient temperature change.

Generally, an engaging pressure for engaging the friction element in a forward range or in a reverse range is set low. Therefore, the standby pressure of the friction element should be lower than that. At low temperatures, at which fluidity of the fluid is low, it is difficult to accurately regulate the extremely low standby pressure with the electromagnetic valve. Accordingly, there is a possibility that the friction element may be engaged unexpectedly.

SUMMARY OF THE INVENTION

It is therefore an object of the present invention to provide an automatic transmission controller that can obtain high engagement response of a friction element while inhibiting unexpected engagement of the friction element.

According to an aspect of the present invention, an automatic transmission controller has an electronic control circuit, an electromagnetic valve, and a pressure control valve. The electronic control circuit generates a control current. The electromagnetic valve regulates a command pressure in accordance with the control current. The pressure control valve has a spool and is formed with a spool hole. The spool reciprocates in the spool hole in accordance with the command pressure to regulate a pressure supplied to a friction element of an automatic transmission. When the friction element is in a standby disengaged state, the electronic control circuit generates an oscillating current as the control current so that the electromagnetic valve generates a standby command pressure as the command pressure to make the spool reciprocate in a range in which no pressure is supplied from the pressure control valve to the friction element. Accordingly, in the pressure control valve that operates in accordance with the standby command pressure, the spool reciprocates in the spool hole in a sliding manner without supplying pressure to the friction element.

Therefore, even if the temperature is low, sticking of the spool to an inner surface of the spool hole through low-viscosity fluid can be inhibited. In addition, an influence of sheer resistance of the fluid over the spool can be suppressed. Accordingly, when a friction element in a disengaged state is engaged, the spool can be driven quickly independently of the ambient temperature. As a result, a high engagement response of the friction element can be obtained. In addition, when the friction element is in the standby disengaged state, pressure is not supplied to the friction element even though the spool of the pressure control valve reciprocates. Therefore, unexpected engagement of the friction element can be inhibited.

BRIEF DESCRIPTION OF THE DRAWINGS

Features and advantages of embodiments will be appreciated, as well as methods of operation and the function of the related parts, from a study of the following detailed description, the appended claims, and the drawings, all of which form a part of this application. In the drawings:

DETAILED DESCRIPTION OF EXAMPLE EMBODIMENTS

Figure 1:
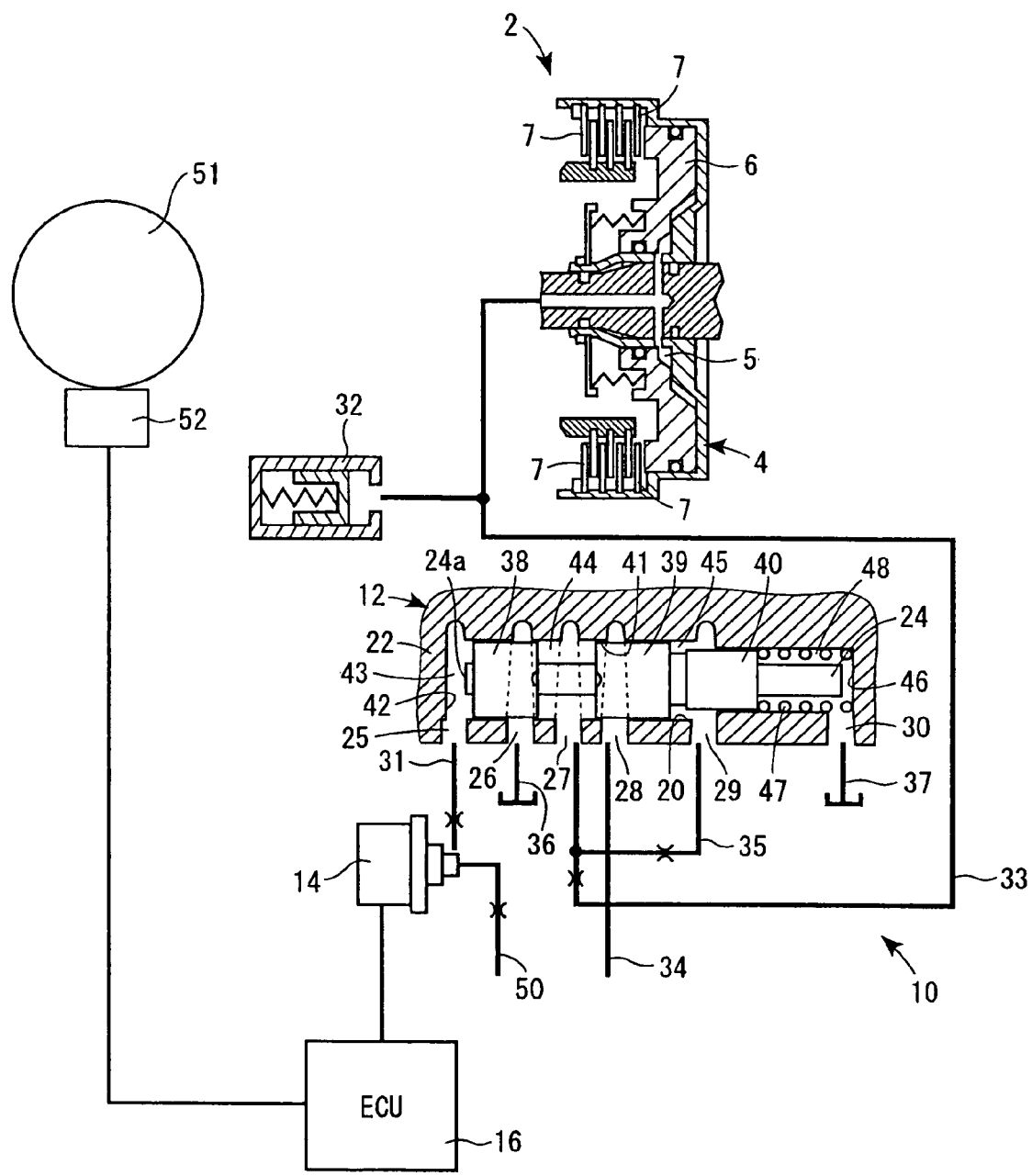
FIG. 1 is a schematic diagram showing an automatic transmission and an automatic transmission controller according to an example embodiment of the present invention.

Referring to FIG. 1, an automatic transmission controller 10 according to an example embodiment of the present invention is illustrated. The automatic transmission controller 10 and an automatic transmission 2 are mounted to a vehicle. The automatic transmission controller 10 controls the automatic transmission 2.

The automatic transmission 2 has multiple clutches 4 that operate in accordance with an oil pressure supplied by the automatic transmission controller 10. Only one clutch 4 is shown in FIG. 1. A clutch piston 6 of the clutch 4 is operated by a pressure of operation oil introduced from the automatic transmission controller 10 into a piston chamber 5 of the clutch 4. Thus, clutch plates 7 of the clutch 4 are engaged or disengaged. The clutch plates 7 are engaged if the pressure of the oil introduced into the piston chamber 5 becomes equal to or higher than a predetermined threshold value. The clutch plates 7 are disengaged if the pressure of the oil introduced into the piston chamber 5 becomes lower than the threshold value. Thus, a range and a change gear ratio of the automatic transmission 2 are changed by changing combination of the engagement and the disengagement of the clutch plates 7 of the clutches 4.

The automatic transmission controller 10 has pressure control valves 12, electromagnetic valves 14 and an electronic control circuit (electronic control unit, ECU) 16. A pressure control valve 12 and electromagnetic valve 14 are provided as a set for each clutch 4. Only one set of pressure control valve 12 and electromagnetic valve 14 is shown in FIG. 1.

The pressure control valve 12 is provided by a spring-driven spool valve. The pressure control valve 12 has a valve body 22 providing a spool hole 20, and a spool 24 that reciprocates in the spool hole 20.

The valve body 22 is formed with six ports 25-30 (a command pressure port 25, a drain port 26, a supply pressure port 27, a base pressure port 28, a feedback port 29, and another drain port 30) so that the six ports 25-30 radially penetrate the valve body 22 and are arranged at certain intervals along a reciprocating direction of the spool 24. The command pressure port 25 is connected with the electromagnetic valve 14 through a fluid passage 31. The supply pressure port 27 is connected with the piston chamber 5 of the clutch 4 through a fluid passage 33, in which a dumper 32 for absorbing pulsations is located. The base pressure port 28 is connected with a fluid passage 34, which has a line pressure in a range where the clutch 4 connected with the supply pressure port 27 is engaged. The line pressure is regulated to a predetermined value by an oil circuit provided by a pump, a pressure control valve and the like, and is supplied to the fluid passage 34 by operation of a manual valve. The feedback port 29 is connected with a fluid passage 35 branching from the fluid passage 33. The drain ports 26, 30 are respectively connected with fluid passages 36, 37 that communicate with an inside of an oil pan.

The spool 24 has three lands 38-40 that are arranged at certain intervals along the reciprocating direction. The lands 38-40 contact a peripheral surface portion 41 of a spool hole inner surface. An oil pressure chamber 43 communicating with the command pressure port 25 is formed between the first land 38 on an end surface 24a side of the spool 24 and a side surface portion 42 of the spool hole inner surface. Operation oil at a command pressure generated by the electromagnetic valve 14 is introduced into the oil pressure chamber 43.

The second land 39 is provided on the other side of the first land 38 opposite from the end surface 24a. An oil pressure chamber 44 communicating with the supply pressure port 27 is formed between the first land 38 and the second land 39. The operation oil lead out of the oil pressure chamber 44 is introduced into the piston chamber 5 of the clutch 4 connected with the supply pressure port 27. The pressure of the oil lead out of the oil pressure chamber 44 coincides with the supply pressure supplied to the clutch 4. The oil pressure chamber 44 can communicate with either one of the drain port 26 and the base pressure port 28 in accordance with the position of the spool 24.

The third land 40 is formed on a side of the second land 39 opposite from the first land 38. An oil pressure chamber 45 communicating with the feedback port 29 is formed between the second land 39 and the third land 40. The operation oil lead out of the oil pressure chamber 44 and fed back into the feedback port 29 is introduced into the oil pressure chamber 45. The pressure of the oil introduced into the oil pressure chamber 45 coincides with the supply pressure. A compression spring 47 as biasing means is interposed between the third land 40 and the other side surface portion 46 of the spool hole inner surface. An oil pressure chamber 48 communicating with the drain port 30 is formed between the third land 40 and the other side surface portion 46.

Figure 2A:
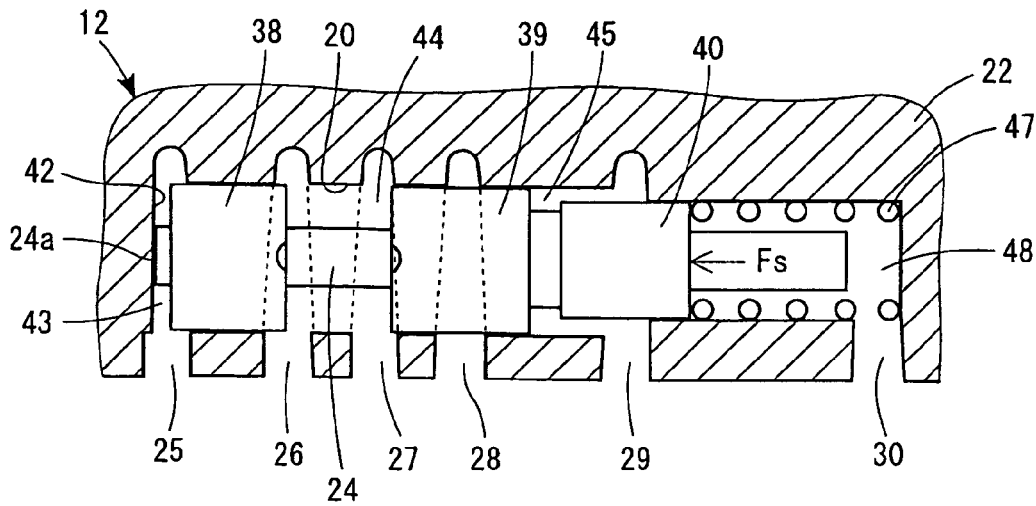
FIGS. 2A-2C are longitudinal cross-sectional diagrams showing a pressure control valve according to the FIG. 1 embodiment.
Figure 2B:
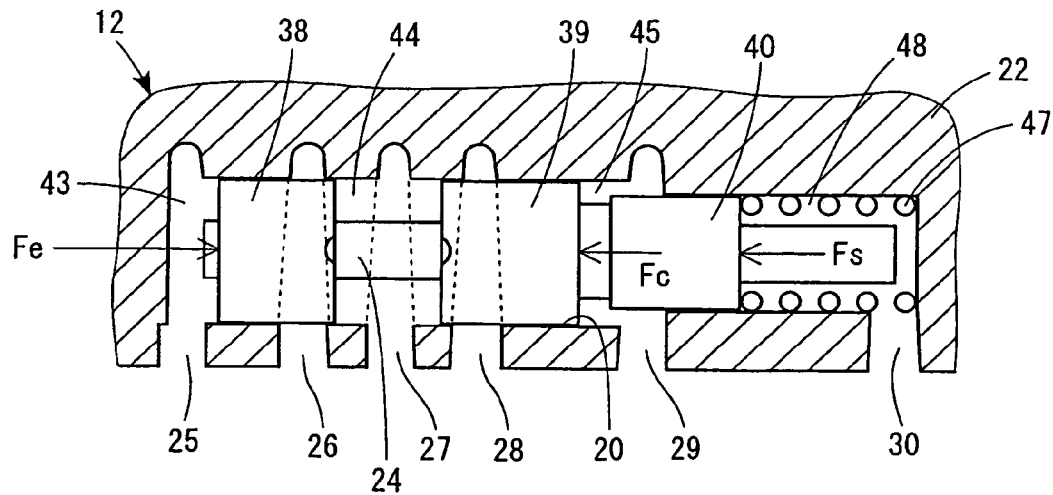
Figure 2C:
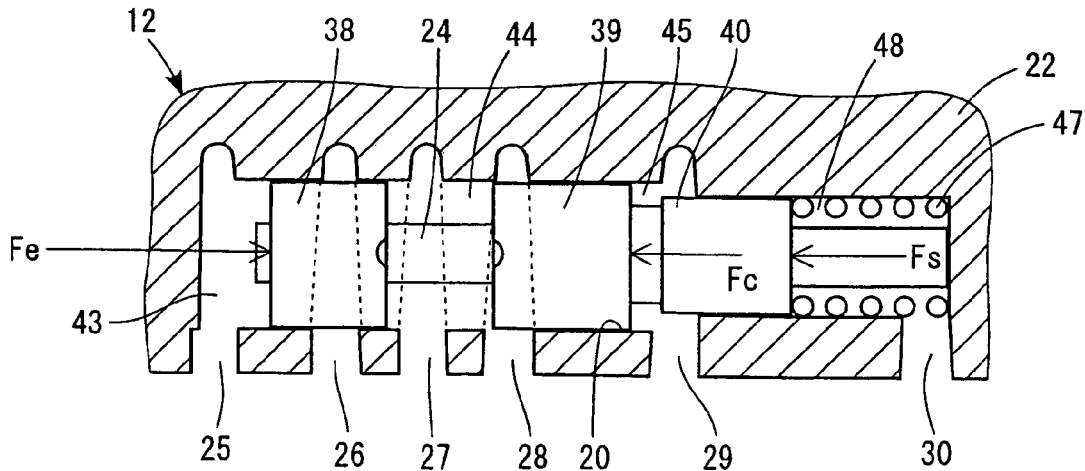

As shown in FIGS. 2B and 2C, in the pressure control valve 12, a force Fe provided by the command pressure of the oil introduced into the oil pressure chamber 43 is applied to the spool 24 in a direction opposite to a biasing force Fs of the compression spring 47 and a force Fc provided by the supply pressure of the oil introduced into the oil pressure chamber 45. In the pressure control valve 12, the spool 24 moves in accordance with the balance among the forces Fe, Fs, Fc. Thus, the oil pressure of the oil lead out of the oil pressure chamber 44, or the supply pressure, is regulated.

As shown in FIGS. 2A and 2B, if the spool 24 is positioned to disconnect the oil pressure chamber 44 from the base pressure port 28, there will be no supply pressure. When the command pressure is not generated, the end surface 24a of the spool 24 contacts the side surface portion 42 of the spool hole 20 due to the biasing force Fs of the compression spring 47 as shown in FIG. 2A. If the spool 24 is positioned to connect the oil pressure chamber 44 with the base pressure port 28 as shown in FIG. 2C, the line pressure is supplied to the oil pressure chamber 44 through the fluid passage 34 and the supply pressure is regulated by using the line pressure as the base pressure. Accordingly, the supply pressure is proportional to the command pressure.

An inlet port of the electromagnetic valve 14 shown in FIG. 1 is connected with a fluid passage 50, which has a modulated pressure. An output port of the electromagnetic valve 14 is connected with the fluid passage 31. The modulated pressure is an oil pressure that is regulated by an oil pressure circuit provided by an electromagnetic valve, a pressure control valve and the like not to exceed the line pressure and that is supplied to the fluid passage 50. The electromagnetic valve 14 regulates the command pressure supplied to the pressure control valve 12 through the fluid passage 31 by using the modulated pressure as the base pressure. The electromagnetic valve 14 is electrically connected with the ECU 16 and generates the oil pressure as the command pressure in proportion to a current value of control current provided by the ECU 16.

Figure 3A:
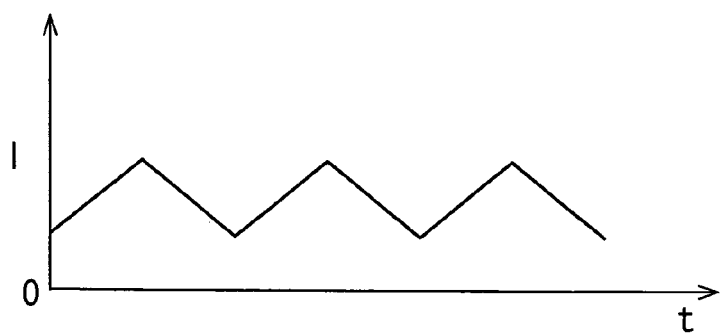
FIG. 3A is a time chart showing control current provided by an electronic control unit according to the FIG. 1 embodiment.

The ECU 16 is structured centering on a microcomputer. The ECU 16 generates the control current supplied to the electromagnetic valves 14 corresponding to the clutches 4. The ECU 16 generates oscillating current having a current value oscillating at a predetermined frequency as the control current of the electromagnetic valve 14 as shown in FIG. 3A. The ECU 16 also generates constant current having a constant current value as the control current of the electromagnetic valve 14. The ECU 16 is electrically connected with a start sensor 52 that directly or indirectly senses a start of a motor 51 of the vehicle. The start sensor 52 senses a rotation speed of the motor 51, turning-on operation of an ignition switch that is a start command of the motor 51, or the like.

When the motor 51 is not operated, the ECU 16 is de-energized and the control current to the electromagnetic valve 14 is not generated. Therefore, the command pressure to each pressure control valve 12 is not generated. Accordingly, as shown in FIG. 2A, in each pressure control valve 12, the end surface 24a of the spool 24 strikes against the side surface portion 42 of the spool hole 20 and is held there. Therefore, the oil pressure is not supplied to the corresponding clutch 4. As a result, the clutches 4 are disengaged.

Figure 3B:
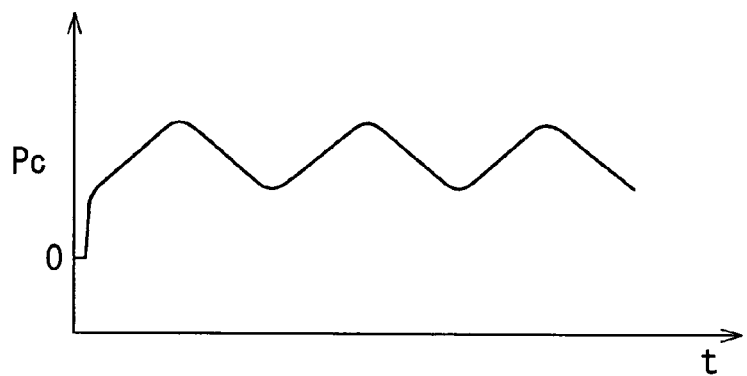
FIG. 3B is a time chart showing command pressure of an electromagnetic valve according to the FIG. 1 embodiment.

If the motor 51 in a dormant state starts, a detection signal indicating the start is transmitted to the ECU 16. Then, the ECU 16 performs a predetermined standby operation until the range of the vehicle is switched. For example, the ECU 16 generates an oscillating current I as the control current of the electromagnetic valves 14 as shown in FIG. 3A. If the electromagnetic valve 14 receives the oscillating current I, the electromagnetic valve 14 generates a standby command pressure Pc as the command pressure of the corresponding pressure control valve 12 as shown in FIG. 3B. The standby command pressure Pc oscillates substantially at the same frequency as the oscillating current I. Thus, in each pressure control valve 12, the spool 24 reciprocates in accordance with the given oscillation of the standby command pressure Pc. Namely, in each pressure control valve 12, the spool 24 reciprocates substantially at the same frequency as the oscillating current I. The ECU 16 is configured to set the amplitude of the oscillating current I so that the spool 24 reciprocates in a range in which the oil pressure chamber 44 is disconnected from the base pressure port 28. The ECU 16 is configured so that the frequency of the oscillating current I is a low frequency, preferably, at 100 Hz or lower. Thus, in each pressure control valve 12, the spool 24 reciprocates at a low frequency not to generate the supply pressure to the corresponding clutch 4.

Figure 4:
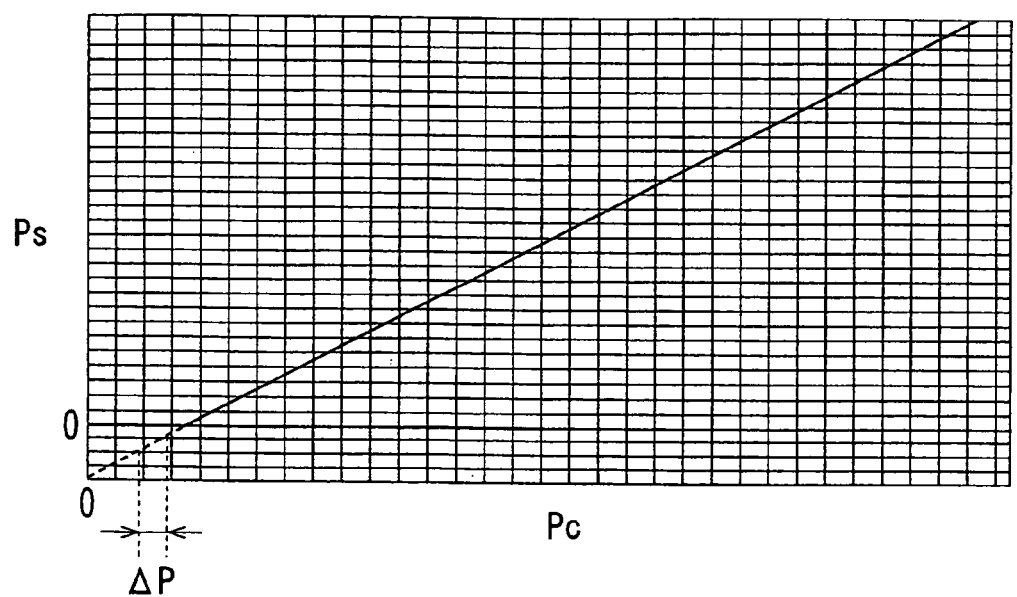
FIG. 4 is a graph showing a relationship between supply pressure and the command pressure according to the FIG. 1 embodiment.

Therefore, in each pressure control valve 12, the spool 24 does not stick to the peripheral surface portion 41 and the side surface portion 42 of the spool hole 20 through low-viscosity operation oil. In addition, the influence of shear resistance due to the operation oil over the spool 24 can be suppressed. Specifically, the standby command pressure Pc acts on the end surface of the first land 38 having a large area on the spool 24. Therefore, the spool 24 can surely reciprocate even if the oscillating amplitude ΔP of the standby command pressure Pc is small as showing in FIG. 4. Accordingly, the sticking of the spool 24 and the influence of the shear resistance can be suppressed effectively. When the clutch 4 in a disengaged state is engaged after the standby operation, the spool 24 of the corresponding pressure control valve 12 can be driven quickly independently of the ambient temperature. Thus, high engagement response of the clutch 4 can be obtained stably even immediately after the start of the motor 51. During the standby operation, the supply pressure Ps supplied to each clutch 4 is not generated even if the spool 24 of the pressure control valve 23 reciprocates due to the standby command pressure Pc that oscillates in the range ΔP shown in FIG. 4. Accordingly, the unexpected engagement of the clutch 4 can be surely prevented. In each pressure control valve 12, center alignment of the spool 24 with respect to the spool hole 20 is automatically attained by the reciprocation. Therefore, there is no need to form grooves for the center alignment on the outer peripheral surfaces of the lands 38-40.

The standby operation is performed immediately after the motor 51 starts. Alternatively, the standby operation may be performed in the case where the range or the change gear ratio has not been switched for a predetermined time or in the case where the ambient temperature becomes lower than a predetermined temperature.

Figure 5:
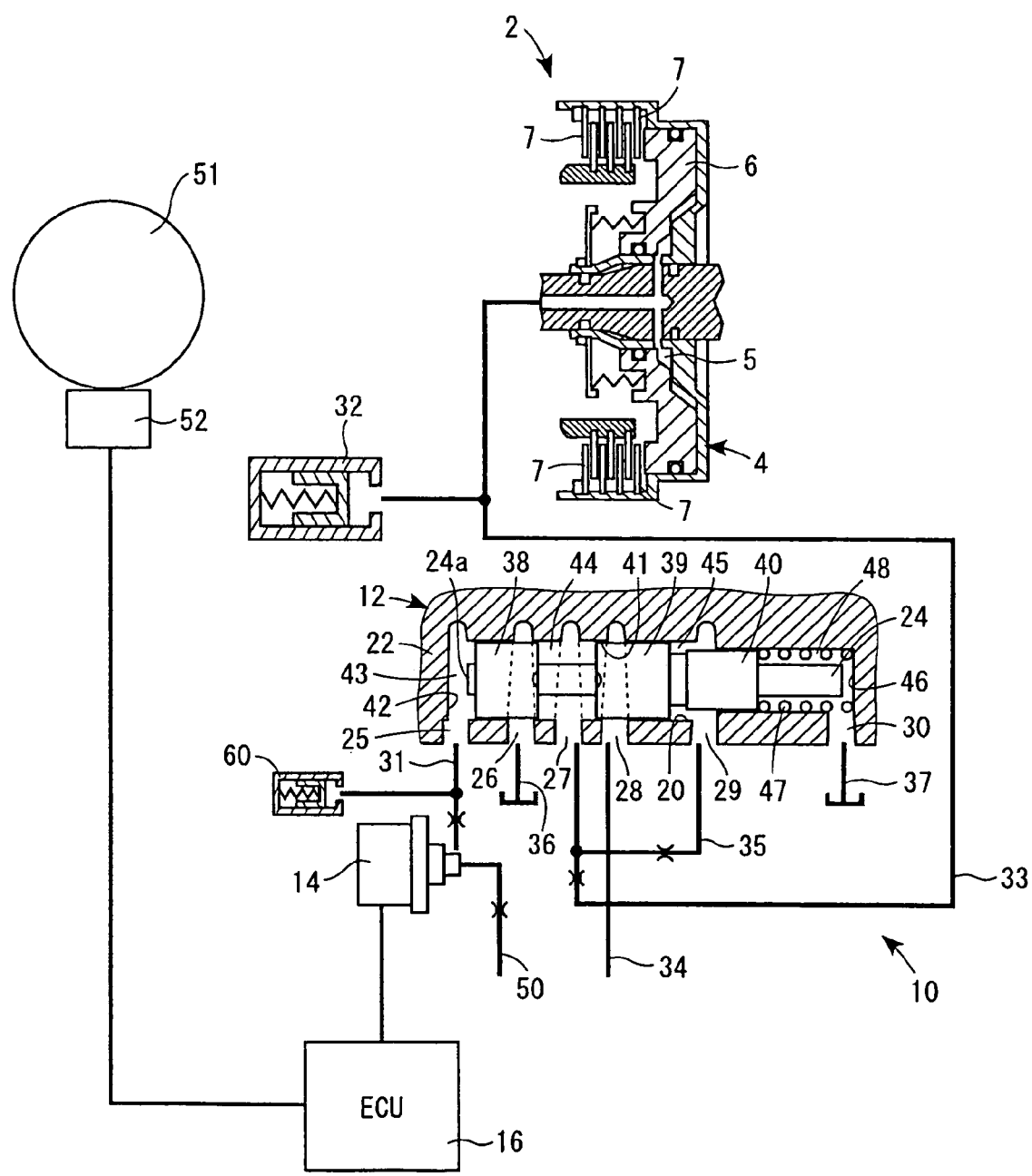
FIG. 5 is a schematic diagram showing an automatic transmission and an automatic transmission controller according to another example embodiment.

A damper 60 may be located in the fluid passage 31 to absorb the pulsations as shown in FIG. 5.

The present invention should not be limited to the disclosed embodiments, but may be implemented in many other ways without departing from the spirit of the invention.

What is claimed is:

1. An automatic transmission controller that controls an automatic transmission of a vehicle by supplying a pressure of a fluid to a friction element of the automatic transmission to engage the friction element, the automatic transmission controller comprising:

an electronic control circuit that generates a control current;

an electromagnetic valve that regulates a command pressure in accordance with the control current; and a pressure control valve that has a spool and is formed with a spool hole, the spool reciprocating in the spool hole in accordance with the command pressure to regulate the pressure supplied to the friction element, wherein in a standby state, when the friction element is in a disengaged state, the electronic control circuit generates an oscillating current as the control current so that the electromagnetic valve generates a standby command pressure as the command pressure to make the spool reciprocate in a range in which no pressure is supplied from the pressure control valve to the friction element.

2. The automatic transmission controller as in claim 1, wherein the electromagnetic valve generates the standby command pressure when the friction element is in the disengaged state immediately after a starter motor of the vehicle starts.

3. The automatic transmission controller as in claim 1, wherein the fluid at the command pressure is introduced into a space between a contact surface in an inner surface of the spool hole and a land that is formed on the spool and is adjacent to the contact surface in the pressure control valve, the contact surface contacting an end surface of the spool when no command pressure is generated.

4. The automatic transmission controller as in claim 1, wherein the electronic control circuit generates the oscillating current at a frequency of 100 Hz or lower.

5. A method of controlling an automatic transmission of a vehicle by supplying a fluid pressure to a friction element of the automatic transmission to engage the friction element, the method comprising the steps of:

generating a control current;

regulating a command pressure supplied by an electromagnetic valve in accordance with the control current;

regulating a pressure supplied to the friction element by making a spool of a pressure control valve reciprocate in a spool hole of the pressure control valve in accordance with the command pressure; and generating an oscillating current as the control current when the friction element is in a disengaged state, so that the electromagnetic valve generates a standby command pressure as the command pressure to make the spool of the pressure control valve reciprocate in a range in which no pressure is supplied from the pressure control valve to the friction element.

6. The method as in claim 5, wherein the electromagnetic valve generates the standby command pressure when the friction element is in the disengaged state immediately after a starter motor of the vehicle starts.

7. The method as in claim 5, wherein the fluid at the command pressure is introduced into a space between a contact surface in an inner surface of the spool hole and a land that is formed on the spool and is adjacent to the contact surface in the pressure control valve, the contact surface contacting an end surface of the spool when the command pressure is not generated.

8. The method as in claim 5, wherein the oscillating current is generated at a frequency of 100 Hz or lower.

* * * * *